United States Patent
Gaben et al.

(10) Patent No.: US 10,950,888 B2
(45) Date of Patent: Mar. 16, 2021

(54) ALL-SOLID-STATE BATTERY INCLUDING A SOLID ELECTROLYTE AND A LAYER OF ION-CONDUCTING MATERIAL

(71) Applicant: I-TEN, Dardilly (FR)

(72) Inventors: Fabien Gaben, Dardilly (FR); Cédric Weiss, Champagne au Mont d'Or (FR); Claire Sorriano, Ecully (FR)

(73) Assignee: I-TEN, Dardilly (FR)

( * ) Notice: Subject to any disclaimer, the term of this patent is extended or adjusted under 35 U.S.C. 154(b) by 296 days.

(21) Appl. No.: 16/062,239

(22) PCT Filed: Dec. 21, 2016

(86) PCT No.: PCT/FR2016/053600
§ 371 (c)(1),
(2) Date: Jun. 14, 2018

(87) PCT Pub. No.: WO2017/115032
PCT Pub. Date: Jul. 6, 2017

(65) Prior Publication Data
US 2018/0375151 A1 Dec. 27, 2018

(30) Foreign Application Priority Data
Dec. 31, 2015 (FR) .................... 15 02748

(51) Int. Cl.
| | | |
|---|---|---|
| *H01M 10/0525* | (2010.01) | |
| *H01M 10/0562* | (2010.01) | |
| *H01M 10/058* | (2010.01) | |
| *H01M 4/04* | (2006.01) | |
| *H01M 4/139* | (2010.01) | |
| *H01M 2/26* | (2006.01) | |
| *H01M 4/02* | (2006.01) | |

(52) U.S. Cl.
CPC ..... *H01M 10/0562* (2013.01); *H01M 4/0404* (2013.01); *H01M 4/0421* (2013.01); *H01M 4/0452* (2013.01); *H01M 4/0457* (2013.01); *H01M 4/139* (2013.01); *H01M 10/058* (2013.01); *H01M 10/0525* (2013.01); *H01M 2/26* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 9,755,272 B2* | 9/2017 | Gaben | ............... | H01M 10/0562 |
| 10,454,092 B2* | 10/2019 | Gaben | ................. | H01M 2/0404 |
| 2002/0034688 A1* | 3/2002 | Chu | .................... | H01M 4/0426 |
| | | | | 429/232 |
| 2015/0333376 A1* | 11/2015 | Gaben | ............... | H01M 10/0585 |
| | | | | 429/156 |
| 2016/0013513 A1* | 1/2016 | Gaben | ................. | H01M 4/1391 |
| | | | | 429/159 |

FOREIGN PATENT DOCUMENTS

| | | |
|---|---|---|
| FR | 3002695 A1 | 8/2014 |
| JP | 2008171588 A | 7/2008 |
| WO | 2014102520 A1 | 7/2014 |

OTHER PUBLICATIONS

JP2008171588A—machine translation (Year: 2008).*

* cited by examiner

*Primary Examiner* — Haroon S. Sheikh
(74) *Attorney, Agent, or Firm* — Jordan IP Law, LLC; Todd A. Vaughn

(57) ABSTRACT

An electrode film of an all-solid-state battery, an all-solid-state battery, and an electrode of an all-solid-state battery, which are fabricated by a process that includes thermally consolidating an electrode film by sintering at a temperature that does not exceed a predetermined threshold of a lowest melting temperature between an anode material and an cathode material.

18 Claims, No Drawings

ALL-SOLID-STATE BATTERY INCLUDING A SOLID ELECTROLYTE AND A LAYER OF ION-CONDUCTING MATERIAL

CROSS-REFERENCE TO RELATED APPLICATIONS

The present application is a National Stage Application of PCT International Application No. PCT/FR2016/053600 (filed on Dec. 21, 2016), under 35 U.S.C. § 371, which claims priority to French Patent Application No. 1502748 (filed on Dec. 31, 2015), which are each hereby incorporated by reference in their respective entireties.

TECHNICAL FIELD

The present invention relates to the field of batteries and in particular lithium-ion batteries. It relates more particularly to all-solid lithium-ion batteries ("Li-ion batteries"), and a new method for manufacturing such batteries.

PRIOR ART

A plurality of modes of manufacturing lithium-ion batteries ("Li-ion batteries") are known. The electrodes of Li-ion batteries can be manufactured using printing or deposition techniques known to a person skilled in the art, in particular deposition via roll coating or doctor blade, or deposition via tape casting. These techniques involve coating an ink containing particles of active materials having a micrometric size onto metal current collectors in order to deposit layers having a thickness typically between 50 and 400 μm. According to the thickness of the electrode, its porosity and the size of the particles of the active materials, the power and the energy of the battery can be modulated.

These batteries have the particularity of containing liquid electrolytes or electrolytes in the form of gelled polymers in order to carry out the transport of the lithium ions between the various active particles of the electrodes. These electrolytes consist of aprotic solvents in which lithium salts are dissolved. However, these electrolytes tend to degrade under the effect of electric potentials and/or temperatures that are too high. This degradation can be violent and fast in the case of an internal short circuit, and can promote thermal runaway of the entire battery cell.

Besides the problems of safety of operation and durability inherent to the use of electrolytes containing aprotic solvents, these architectures also do not allow the electrochemical performance of the cell to be optimized. The porosity necessary for the wetting of the electrodes leads to a loss of volume energy density and mass energy density of the electrodes.

The manufacturing of all-solid Li-ion batteries, without liquid electrolytes containing aprotic solvents, would allow the performance of the Li-ion batteries to be considerably improved. To reach a high volume energy density, battery electrodes would have to be arranged in the form of compact thin films, in which the lithium ions can easily diffuse, without having to add electrolytes that conduct the lithium ions or electrically conductive particles into the electrodes.

Such electrodes and all-solid batteries can be deposited using vacuum deposition techniques, such as PVD and/or CVD. All-solid battery electrodes are thus obtained, without porosity and not containing any binder, organic electrolyte or electronic conductors in the electrodes. These techniques also allow layers of electrolyte to be deposited onto the electrodes. This deposition is conformal, perfectly follows the surface roughness, is very adhesive and does not require heat treatment at high temperature. The vacuum deposition techniques thus allow a precise definition of the interface between the electrode and the electrolyte to be guaranteed, without interdiffusion of one of the layers into the other or a risk of points of poor mechanical contact between the two layers. High-quality interfaces that are not very resistive, are well suited to the manufacturing of all-solid batteries and are provided with high power densities are thus obtained.

However, these vacuum deposition techniques are costly to implement and do not allow access to complex chemical compositions, with more than two or three distinct chemical elements. Moreover, the thicknesses accessible with these techniques remain limited and only very rarely exceed 5 μm.

More recently, thin films were deposited via electrophoresis of nanoparticles. This technique is easier to implement than the vacuum deposition techniques, it further allows electrodes to be made with more complex chemical formulations, see electrodes consisting of two distinct phases. The layers of nanoparticles thus deposited can be consolidated via simple drying or via heat treatments at relatively low temperatures. This limits the interdiffusion at the interfaces, an undesirable phenomenon that can lead to new chemical compounds, the ionic and/or electronic conductivity properties of which can be very different from those of the original component. Layers of electrodes and of electrolyte that are all-solid, dense and functional are thus obtained.

The techniques using inks do not allow the deposition to be carried out in very thin layers. And if it was desired to use these techniques to make all-solid electrodes, debindering annealing would have to be carried out in order to burn the organic products that were used to create the inks, and the layers would have to be consolidated. The consolidation is typically carried out via a heat treatment at high temperature, called sintering. Sintering leads to shrinking, this does not allow metal substrates to be worked on directly without the risk of cracking. Moreover, because of the high temperature, sintering promotes interdiffusion at the various interfaces, with the disadvantages described above.

In order to reduce the porosities between the particles without using high-temperature sintering, solid and relatively fusible ionic conductors are used to bind the particles of electrodes and of electrolyte to each other or to bind the particles of electrolyte to each other. This also allows the integrity of the encapsulation layer of the final battery to be improved.

The quality of the encapsulation is of capital importance for Li-ion batteries. Indeed, in order to guarantee their calendar life, Li-ion batteries must be perfectly encapsulated and protected from the outside environment. The techniques of deposition via ALD (Atomic layer deposition) are particularly well suited for covering the surfaces of the battery cells in a totally impermeable and conformal manner. The encapsulation layers thus obtained generally consist of oxides, such as $Al_2O_3$ or other, having a thickness in the order of fifty nanometers. These layers are consequently very fragile mechanically and require a rigid bearing surface. The deposition of a fragile layer onto a flexible surface would lead to the formation of cracks, leading to a loss of integrity of this protective layer. Moreover, in order to allow a relatively high deposition rate industrially, these layers must be deposited at a rather high temperature, between 200 and 300° C.

However, the usual electrolytes containing polymers containing lithium salts do not resist such temperatures and do not have a surface sufficiently rigid to guarantee the creation of high-quality encapsulation with the methods for deposition via ALD.

A first goal of the present invention is to propose a method for manufacturing batteries from all-solid thin films, not leading to the appearance of phases at the interface between the two layers of electrolytes to be assembled but also between the layers of electrolyte and electrode.

Another goal of the present invention is to propose a method for manufacturing a battery, which can consist of multilayer assemblies of cells that are all-solid and have good performance, at a low temperature without leading to a phenomenon of interdiffusion at the interfaces with the electrodes, or any other glass transition of the films of solid electrolyte caused by methods of assemblies that are too hot.

Another goal of the invention is to allow solid thin films of electrolyte of different types to be assembled at low temperature in order to optimize the choices of electrolytes on each of the electrodes in such a way as to obtain the best compromises in terms of chemical stability of the interfaces, ionic conductivity and electric insulation.

Another goal of the present invention is to facilitate the encapsulation of the battery.

Another goal of the present invention is to guarantee the mechanical rigidity necessary for carrying out high-quality encapsulation.

Yet another goal is to obtain a sufficiently low internal resistance in the battery, that is to say, ionic conduction in the electrolyte that is sufficiently high to allow the battery to deliver a significant power density.

Another goal of the invention is to manufacture batteries made of thin films via a method that can be implemented industrially in a rather simple manner.

OBJECTS OF THE INVENTION

A first object of the invention relates to a method for manufacturing an all-solid battery made of thin films, comprising the following successive steps:
  a) a layer comprising at least one anode material (here, called "layer of anode material") is deposited on its conductive substrate, preferably selected from the group formed by a metal sheet, a metal strip, a metallized insulating sheet, a metallized insulating strip, a metallized insulating film, said conductive substrates, or their conductive elements, being able to act as an anode current collector;
  b) a layer comprising at least one cathode material (here, called "layer of cathode material") is deposited on its conductive substrate, preferably selected from the group formed by a metal sheet, a metal strip, a metallized insulating sheet, a metallized insulating strip, a metallized insulating film, said conductive substrates, or their conductive elements, being able to act as a cathode current collector, with it being understood that steps a) and b) can be inverted;
  c) a layer comprising at least one solid electrolyte material (here, called "layer of electrolyte material") is deposited on at least one layer obtained in step a) and/or b);
  d) a layer of a solution of an ionic conductive material, preferably, at least one lithium salt is deposited:
    either on the layer of anode material coated with a layer of solid electrolyte material and/or on the layer of cathode material coated or not coated with a layer of solid electrolyte material;
    or on the layer of cathode material coated with a layer of solid electrolyte material and/or on the layer of anode material coated or not coated with a layer of solid electrolyte material;
  e) said layer of said solution of the ionic conductive material obtained in step d) is dried in order to obtain a layer of an ionic conductive material; the thickness of the layer of said ionic conductive material being less than 10 µm, preferably less than 5 µm, and even more preferably less than 2 µm;
  f) a layer of anode material obtained in step a), c) or e) is successively stacked, face on face, with a layer of cathode material obtained in step b), c) or e), with it being understood that the stack comprises at least one layer of solid electrolyte material obtained in step c) and at least one layer of an ionic conductive material obtained in step e);
  g) a heat treatment and/or a mechanical compression of the stack obtained in step e) is carried out in order to obtain an all-solid battery made of thin films.

Advantageously, a recrystallization heat treatment or a consolidation of the layer of anode and/or of cathode and/or of electrolyte is carried out at a temperature between 300° C. and 1000° C., preferably between 400° C. and 800° C., and even more preferably between 500° C. and 700° C. Advantageously, the recrystallization heat treatment of the layer of anode and/or of cathode and/or of electrolyte is carried out after the step a) and/or b) of depositing the layer of anode and/or of cathode, and/or after the step c) of depositing the layer of electrolyte.

Advantageously, after the step a) and/or b) of depositing the layer of anode and/or of cathode, and/or after the step c) of depositing the layer of electrolyte, a recrystallization heat treatment of the layer of anode and/or of cathode and/or of electrolyte, respectively, is carried out, preferably at a temperature between 300° C. and 1000° C., more preferably between 400° C. and 800° C., and even more preferably between 500° C. and 700° C.

Preferably, the ionic conductive material used in step d) is chosen from:
  a. the silicates, preferably chosen from $Li_2Si_2O_5$, $Li_2SiO_3$, $Li_2Si_2O_6$, $LiAlSiO_4$, $Li_4SiO_4$, $LiAlSi_2O_6$
  b. the glass-ceramic compounds chosen from the mixtures $Li_3BO_3$—$Li_2SO_4$, $Li_3BO_3$—$Li_2SiO_4$, $Li_3BO_3$—$Li_2SO_4Li_2SiO_4$,
  c. the ionic conductors of lithium ions chosen from: LiCl, LiBr, LiI, LiF, LiBH4, LiH, LiOH, $LiBO_2$, $LiPO_3$, $LiNO_3$, $Li_3N$, $Li_2SO_4$, $LiVO_3$, $Li_2MoO_4$, $Li_2B_4O_7$, or a mixture of these compounds.
  d. the antiperovskite solid electrolytes chosen from: $Li_3OA$ with A a halide or a mixture of halides, preferably at least one of the elements chosen from F, Cl, Br, I or a mixture of two or three or four of these elements; $Li_{(3-x)}M_{x/2}OA$ with $0<x\leq3$, M a divalent metal, preferably at least one of the elements chosen from Mg, Ca, Ba, Sr or a mixture of two or three or four of these elements, A a halide or a mixture of halides, preferably at least one of the elements chosen from F, Cl, Br, I or a mixture of two or three or four of these elements; $Li_{(3-x)}N_{x/3}OA$ with $0\leq x\leq3$, N a trivalent metal, A a halide or a mixture of halides, preferably at least one of the elements chosen from F, Cl, Br, I or a mixture of two or three or four of these elements; or $LiCOX_zY_{(1-z)}$, with X and Y halides and $0\leq z\leq1$.

Preferably, the materials that are ionic conductors of lithium ions are used in amorphous form.

Advantageously, the materials that are ionic conductors of lithium ions comprise at least one additional compound, chosen preferably, from the salts of halides, and advantageously chosen from the salts KCl, KBr, KI, KF, NaCl, NaBr, NaI and NaF.

The layers of anode, of cathode and of solid electrolyte are deposited among at least one of the following techniques:
(i) physical vapor deposition (PVD), and more particularly via evaporation under vacuum, via laser ablation, via an ion beam, via cathode sputtering;
(ii) chemical vapor deposition (CVD), and more particularly plasma-enhanced (PECVD), laser-assisted (LACVD), or aerosol-assisted (AA-CVD);
(iii) atomic layer deposition (ALD);
(iv) electrospraying;
(v) electrophoresis;
(vi) aerosol deposition;
(vii) sol-gel;
(viii) coating, more particularly dip coating, spin coating, or the Langmuir-Blodgett method.

Preferably, the layers of anode, of cathode and of electrolyte are deposited via electrospraying, electrophoresis, using an aerosol, coating, and are preferably, all deposited via electrophoresis.

Advantageously, the layers of anode and/or cathode material further comprise electronic conductive materials, and in particular of graphite, and/or nanoparticles of materials that conduct lithium ions, of the type of those used to create the films of electrolyte, or polymer materials comprising ionic groups.

In one specific embodiment, the layers of anode and/or of cathode and/or of electrolyte are created via deposition of nanoparticles of anode, cathode or electrolyte material, respectively, out of at least one of the following techniques: electrospraying, electrophoresis, aerosol deposition, coating.

Preferably, the layers of nanoparticles of anode, cathode and electrolyte material are all deposited via electrophoresis.

Advantageously, the heat treatment allowing the assembly of the battery is carried out at a temperature between 50° C. and 500° C., preferably at a temperature of less than 350° C., and even more preferably between 100° C. and 200° C. and/or in that the mechanical compression of the layers to be assembled is carried out at a pressure between 10 and 100 MPa, preferably between 20 and 50 MPa.

The layer of anode material a) is made from a material chosen from:
(i) the oxynitrides of tin (having the typical formula $SnO_xN_y$);
(ii) lithium iron phosphate (having the typical formula $LiFePO_4$);
(iii) the mixed oxynitrides of silicon and tin (having the typical formula $Si_aSn_bO_yN_z$ with $a>0$, $b>0$, $a+b\leq 2$, $0<y\leq 4$, $0<z\leq 3$) (also called SiTON), and in particular $SiSn_{0.87}O_{1.2}N_{1.72}$; as well as the oxynitride-carbides having the typical formula $Si_aSn_bC_cO_yN_z$ with $a>0$, $b>0$, $a+b\leq 2$, $0<c<10$, $0<y<24$, $0<z<17$; $Si_aSn_bC_cO_yN_zX_n$ with $X_n$ at least one of the elements out of F, Cl, Br, I, S, Se, Te, P, As, Sb, Bi, Ge, Pb and $a>0$, $b>0$, $a+b\leq 2$, $0<c<10$, $0<y<24$ and $0<z<17$; and $Si_aSn_bO_yN_zX_n$ with $X_n$ at least one of the elements out of F, Cl, Br, I, S, Se, Te, P, As, Sb, Bi, Ge, Pb and $a>0$, $b>0$, $a+b\leq 2$, $0<y\leq 4$ and $0<z\leq 3$;
(iv) the nitrides of the type $Si_xN_y$ (in particular with $x=3$ and $y=4$), $Sn_xN_y$ (in particular with $x=3$ and $y=4$), $Zn_xN_y$ (in particular with $x=3$ and $y=4$), $Li_{3-x}M_xN$ (with M=Co, Ni, Cu);
(v) the oxides $SnO_2$, $Li_4Ti_5O_{12}$, $SnB_{0.6}P_{0.4}O_{2.9}$ and $TiO_2$.

The layer of cathode material b) is made from a cathode material chosen from:
(i) the oxides $LiMn_2O_4$, $LiCoO_2$, $LiNiO_2$, $LiMn_{1.5}Ni_{0.5}O_4$, $LiMn_{1.5}Ni_{0.5-x}X_xO_4$ (where x is selected from Al, Fe, Cr, Co, Rh, Nd, other rare earths, and where $0<x<0.1$), $LiFeO_2$, $LiMn_{1/3}Ni_{1/3}Co_{1/3}O_4$;
(ii) the phosphates $LiFePO_4$, $LiMnPO_4$, $LiCoPO_4$, $LiNiPO_4$, $Li_3V_2(PO_4)_3$; the phosphates having the formula $LiMM'PO_4$, with M and M' (M≠M') selected from Fe, Mn, Ni, Co, V;
(iii) all of the lithiated forms of the following chalcogenides: $V_2O_5$, $V_3O_8$, $TiS_2$, the oxysulfides of titanium ($TiO_yS_z$), the oxysulfides of tungsten ($WO_yS_z$), CuS, $CuS_2$.

Advantageously, the layer of electrolyte material c) is made from an electrolyte material chosen from:
the garnets having the formula $Li_dA^1_xA^2_y(TO_4)_z$ where
$A^1$ is a cation having the oxidation state +II, preferably Ca, Mg, Sr, Ba, Fe, Mn, Zn, Y, Gd; and where
$A^2$ is a cation having the oxidation state +III, preferably Al, Fe, Cr, Ga, Ti, La; and where
$(TO_4)$ is an anion in which T is an atom having the oxidation state +IV, located at the center of a tetrahedron formed by the atoms of oxygen, and wherein $TO_4$ advantageously represents the anion silicate or zirconate, wherein all or a portion of the elements T having an oxidation state of +IV can be replaced by atoms having an oxidation state of +III or +V, such as Al, Fe, As, V, Nb, In, Ta;
wherein: d is between 2 and 10, preferably between 3 and 9, and more preferably between 4 and 8; x is 3 but can be between 2.6 and 3.4 (preferably between 2.8 and 3.2); y is 2 but can be between 1.7 and 2.3 (preferably between 1.9 and 2.1) and z is 3 but can be between 2.9 and 3.1;
the garnets, preferably chosen from: $Li_7La_3Zr_2O_{12}$; $Li_6La_2BaTa_2O_{12}$; $Li_{5.5}La_3Nb_{1.75}In_{0.25}O_{12}$; $Li_5La_3M_2O_{12}$ with M=Nb or Ta or a mixture of the two compounds; $Li_{7-x}Ba_xLa_{3-x}M_2O_{12}$ with $0\leq x\leq 1$ and M=Nb or Ta or a mixture of the two compounds; $Li_{7-x}La_3Zr_{2-x}M_xO_{12}$ with $0\leq x\leq 2$ and M=Al, Ga or Ta or a mixture of two or three of these compounds;
the lithiated phosphates, preferably chosen from: $Li_3PO_4$; $Li_3(Sc_{2-x}M_x)(PO_4)_3$ with M=Al or Y and $0\leq x\leq 1$; $Li_{1+x}M_x(Sc)_{2-x}(PO_4)_3$ with M=Al, Y, Ga or a mixture of the three compounds and $0\leq x\leq 0.8$; $Li_{1+x}M_x(Ga_{1-y}Sc_y)_{2-x}(PO_4)_3$ with $0\leq x\leq 0.8$; $0\leq y\leq 1$ and M=Al or Y or a mixture of the two compounds; $Li_{1+x}M_x(Ga)_{2-x}(PO_4)_3$ with M=Al, Y or a mixture of the two compounds and $0\leq x\leq 0.8$; $Li_{1+x}Al_xTi_{2-x}(PO_4)_3$ with $0\leq x\leq 1$, or $Li_{1+x}Al_xGe_{2-x}(PO_4)_3$ with $0\leq x\leq 1$; or $Li_{1+x+z}M_x(Ge_{1-y}Ti_y)_{2-x}Si_zP_{3-z}O_{12}$ with $0\leq x\leq 0.8$ and $0\leq y\leq 1.0$ & $0\leq z\leq 0.6$ and M=Al, Ga or Y or a mixture of two or three of these compounds; $Li_{3+y}(Sc_{2-x}M_x)Q_yP_{3-y}O_{12}$, with M=Al and/or Y and Q=Si and/or Se, $0\leq x\leq 0.8$ and $0\leq y\leq 1$; or $Li_{1+x+y}M_xSc_{2-x}Q_yP_{3-y}O_{12}$, with M=Al, Y, Ga or a mixture of the three compounds and Q=Si and/or Se, $0\leq x\leq 0.8$ and $0\leq y\leq 1$; or $Li_{1+x+y+z}M_x(Ga_{1-y}Sc_y)_{2-x}Q_zP_{3-z}O_{12}$ with $0\leq x\leq 0.8$; $0\leq y\leq 1$; $0\leq z\leq 0.6$ with M=Al or Y or a mixture of the two compounds and Q=Si and/or Se; or $Li_{1+x}N_xM_{2-x}P_3O_{12}$, with $0\leq x\leq 1$ and N=Cr and/or V, M=Sc, Sn, Zr, Hf, Se or Si, or a mixture of these compounds;

the lithiated sulfur compounds, preferably chosen from: $Li_xAl_{z-y}Ga_yS_w(PO_4)_c$ with $4<w<20$, $3<x<10$, $0\leq y<1$, $1\leq z<4$ and $0<c<20$; $Li_xAl_{z-y}Ga_yS_w(BO_3)_c$ with $4<w<20$, $3<x<10$, $0\leq y<1$, $1\leq z<4$ and $0<c<20$; $Li_xAl_{z-y}Sc_yS_w(PO_4)_c$ with $4<w<20$, $3<x<10$, $0\leq y<1$, $1\leq z<4$ and $0<c<20$; $Li_xAl_{z-y}Sc_yS_w(BO_3)_c$ with $4<w<20$, $3<x<10$, $0\leq y<1$, $1\leq z<4$ and $0<c<20$; $Li_xGe_{z-y}Si_yS_w(PO_4)_c$ with $4<w<20$, $3<x<10$, $0\leq y<1$, $1\leq z<4$ and $0<c<20$; $Li_xGe_{(z-y)}Si_yS_w(BO_3)_c$ with $4<w<20$, $3<x<10$, $0\leq y<1$, $1\leq z<4$ and $0<c<20$;

the lithiated borates, preferably chosen from: $Li_3(Sc_{2-x}M_x)(BO_3)_3$ with M=Al or Y and $0\leq x\leq 1$; $Li_{1+x}M_x(Sc)_{2-x}(BO_3)_3$ with M=Al, Y, Ga or a mixture of the three compounds and $0\leq x\leq 0.8$; $0\leq y\leq 1$; $Li_{1+x}M_x(Ga_{1-y}Sc_y)_{2-x}(BO_3)_3$ with $0\leq x\leq 0.8$; $0\leq y\leq 1$ and M=Al or Y; $Li_{1+x}M_x(Ga)_{2-x}(BO_3)_3$ with M=Al, Y or a mixture of the two compounds and $0\leq x\leq 0.8$; $0\leq y\leq 1$; $Li_3BO_3$, $Li_3BO_3$—$Li_2SO_4$, $Li_3BO_3$—$Li_2SiO_4$, $Li_3BO_3$—$Li_2SiO_4$—$Li_2SO_4$;

the oxynitrides, preferably chosen from $Li_3PO_{4-x}N_{2x/3}$, $Li_4SiO_{4-x}N_{2x/3}$, $Li_4GeO_{4-x}N_{2x/3}$ with $0<x<4$ or $Li_3BO_{3-x}N_{2x/3}$ with $0<x<3$; the materials containing lithium oxynitrides of phosphorus or of boron (called LiPON and LIBON) that can also contain silicon, sulfur, zirconium, aluminum, or a combination of aluminum, boron, sulfur and/or silicon, and boron for the of lithium of phosphorus;

the lithiated oxides, preferably chosen from $Li_7La_3Zr_2O_{12}$ or $Li_{5+x}La_3(Zr_x,A_{2-x})O_{12}$ with A=Sc, Y, Al, Ga and $1.4\leq x\leq 2$ or $Li_{0.35}La_{0.55}TiO_3$;

the silicates, preferably chosen from $Li_2Si_2O_5$, $Li_2SiO_3$, $Li_2Si_2O_6$, $LiAlSiO_4$, $Li_4SiO_4$, $LiAlSi_2O_6$;

the antiperovskite solid electrolytes chosen from: $Li_3OA$ with A a halide or a mixture of halides, preferably at least one of the elements chosen from F, Cl, Br, I or a mixture of two or three or four of these elements; $Li_{(3-x)}M_{x/2}OA$ with $0<x\leq 3$, M a divalent metal, preferably at least one of the elements chosen from Mg, Ca, Ba, Sr or a mixture of two or three or four of these elements, A a halide or a mixture of halides, preferably at least one of the elements chosen from F, Cl, Br, I or a mixture of two or three or four of these elements; $Li_{(3-x)}N_{x/3}OA$ with $0\leq x\leq 3$, N a trivalent metal, A a halide or a mixture of halides, preferably at least one of the elements chosen from F, Cl, Br, I or a mixture of two or three or four of these elements; or $LiCOX_zY_{(1-z)}$, with X and Y halides and $0\leq z\leq 1$.

In a specific embodiment, the method further comprises a step h) of encapsulation of the battery obtained in step g) via deposition of at least one encapsulation layer of ceramic, glass or glass-ceramic material.

Preferably, the size of the nanoparticles of electrolyte materials is less than 100 nm, preferably less than 30 nm.

Preferably, the conductive substrates are made of aluminum, copper, stainless steel, titanium or nickel, preferably nickel, and optionally coated with a noble metal chosen from the following metals: gold, platinum, palladium, vanadium, cobalt, nickel, manganese, of niobium, tantalum, chromium, molybdenum, titanium, palladium, zirconium, tungsten or any alloy comprising at least one of these metals. Another object of the invention relates to a battery suitable for being obtained via the method according to the invention.

Advantageously, the surface capacity of the cathode is greater than or equal to the surface capacity of the anode.

In a preferred embodiment, the stack of the layers of cathode and of anode is offset laterally.

Advantageously, the battery comprises at least one encapsulation layer, preferably a layer made of ceramic oxide, glass or glass-ceramic.

Even more advantageously, the battery comprises a second organic encapsulation layer deposited on said first encapsulation layer, said second encapsulation layer preferably being made of silicone or parylene.

Preferably, said at least one encapsulation layer totally coats four of the six faces of said battery and partially coats the two remaining faces, located under the metallizations used for the connections of the battery.

In one specific embodiment, the battery comprises terminations at the location where the cathode, and respectively anode, current collector is visible.

Advantageously, the anode connections and the cathode connections are located on the opposite sides of the stack.

DETAILED DESCRIPTION OF THE INVENTION

In the context of the present invention, "electrophoretic deposit" or "deposit via electrophoresis" means a layer deposited via a method for depositing particles previously placed in suspension in a liquid medium, on a substrate that is preferably conductive, the movement of the particles towards the surface of the substrate being generated by applying an electric field between two electrodes placed in the suspension, one of the electrodes forming the conducive substrate on which the deposit is made, the other electrode ("counter electrode") being placed in the liquid phase. A deposit called "dense" with particles is formed on the substrate, if the zeta potential of the suspension of the particles has a suitable value, and/or after a specific treatment of densification of a thermal and/or mechanical nature. This deposit has a structure that is specific and can be recognized by a person skilled in the art who distinguishes it from the deposits obtained via any other technique.

In the context of the present document, the size of a particle is its greatest dimension. Thus, a "nanoparticle" is a particle, at least one of the dimensions of which is less than 100 nm. The "size of particles" or "average size of particles" of a powder or of a set of the particles is given as $D_{50}$.

Here, "all solid" battery (also called "entirely solid" battery here) means a battery comprising an all-solid thin film of anode, an all-solid thin film of electrolyte and an all-solid thin film of cathode, i.e. layers having high geometric precision, in particular a precisely controlled thickness, and a very low number of defects. In the context of the present invention, the thickness of each of the thin films present in the battery, after densification, is less than 10 μm and preferably less than 5 μm. The thickness of the layer of electrolyte after densification is advantageously less than 5 μm, preferably less than 2 μm and even more preferably less than 1 μm. The porosity of each of the thin films present in the battery, after densification, is less than 15%, preferably less than 10% and even more preferably less than 5%. The battery, resulting from the assembly of these all-solid thin films, has both an increased power density and a better energy density. These batteries also have an improved service life that can resist exposure to high temperatures without deteriorating.

These batteries, once manufactured, do not comprise any material in liquid phase.

"Lithium salt" means any compound that dissociates in ionic form in a suitable solvent. "Surface capacity" of an electrode means the quantity of lithium ion capable of being inserted into an electrode (expressed in $\mu Ah/cm^2$).

To overcome the disadvantages mentioned above, the inventor has developed a new method for manufacturing an all-solid battery, consisting of multilayer assemblies of all-solid cells and having good performance at low temperature. The goals are reached by implementing a method for manufacturing a battery made of a thin film comprising at least one layer of an ionic conductive material. In order to obtain batteries having good energy density and power density, the batteries obtained by the method according to the invention have a multilayer structure, contrary to the planar structures of the conventional batteries made of thin films.

During the manufacturing of the battery, advantageously, the layers of anode and/or of cathode and/or of electrolyte undergo a recrystallization heat treatment or a consolidation allowing the layers to be densified. This recrystallization heat treatment of the layer is carried out at a temperature between 300° C. and 1000° C., preferably between 400° C. and 800° C., and even more preferably between 500° C. and 700° C. Advantageously, the recrystallization heat treatment of the layer of anode and/or of cathode and/or of electrolyte is carried out after the step a) and/or b) of depositing the layer of anode and/or of cathode, and/or after the step c) of depositing the layer of electrolyte.

With regard to these consolidations, ideally each of the electrodes (anode and cathode) is consolidated separately before the deposition of a layer comprising at least one solid electrolyte material. Once the deposition of this layer of solid electrolyte is carried out on at least one of the electrodes (anode or cathode) and dried, either this deposit of electrolyte is consolidated, i.e. recrystallized before an ionic conductive material, preferably at least one lithium salt, which will then be used to carry out the assembly at low temperature, is applied, or the ionic conductive material, preferably at least one lithium salt, is deposited on this dried layer, on which porosities can remain present, and then in this case the ionic conductive material will be used for the assembly and for the sintering, in solution (consolidation), of the particles of solid electrolyte.

Moreover, after manufacturing and deposition of at least one layer of an ionic conductive material, these batteries are assembled at a relatively low temperature, i.e. at a temperature of less than 500° C., preferably less than 350° C., without reducing the surface capacity of the electrodes forming the resulting battery. The manufacturing of an "all-solid" battery requires the use of dimensionally stable materials, in order to make the behavior of the battery reliable, in particular with regard to the limitation of the deformation stresses on the encapsulation or on the electrodes.

The layers of anode, of cathode and of solid electrolyte are deposited among at least one of the following techniques, known as such:

- Physical vapor deposition (PVD), and more particularly via evaporation under vacuum, via laser ablation, via an ion beam, via cathode sputtering;
- Chemical vapor deposition (CVD), and more particularly plasma-enhanced (PECVD), laser-assisted (LACVD), or aerosol-assisted (AA-CVD);
- Atomic layer deposition (ALD);
- Electrospraying;
- Electrophoresis;
- Aerosol deposition;
- The sol-gel technique;
- Coating, more particularly dip coating, spin coating, or the Langmuir-Blodgett method.

According to the invention, the layers of anode, of cathode and of solid electrolyte are advantageously deposited via electrophoresis. The electrophoretic deposition of particles is carried out by applying an electric field between the substrate on which the deposition is carried out and a counter electrode, allowing the charged particles of the colloidal suspension to be moved and deposited on the substrate. The absence of binders and other solvents deposited on the surface with the particles allows very compact deposits to be obtained. The compactness obtained via the electrophoretic deposition largely limits the risk of cracking or of appearance of other defects in the deposition during the drying steps. Moreover, the deposition rate can be very high according to the electric field applied and the electrophoretic mobility of the particles in suspension.

According to the invention, the method for manufacturing an all-solid battery according to the invention comprises a step a) of depositing a layer of anode materials, which are preferably chosen from:

(i) the oxynitrides of tin (having the typical formula $SnO_xN_y$);

(ii) lithium iron phosphate (having the typical formula $LiFePO_4$);

(iii) the mixed oxynitrides of silicon and tin (having the typical formula $Si_aSn_bO_yN_z$ with a>0, b>0, a+b≤2, 0<y≤4, 0<z≤3) (also called SiTON), and in particular $SiSn_{0.87}O_{1.2}N_{1.72}$; as well as the oxynitride-carbides having the typical formula $Si_aSn_bC_cO_yN_z$ with a>0, b>0, a+b≤2, 0<c<10, 0<y<24, 0<z<17; $Si_aSn_bC_cO_yN_zX_n$ with $X_n$ at least one of the elements out of F, Cl, Br, I, S, Se, Te, P, As, Sb, Bi, Ge, Pb and a>0, b>0, a+b>0, a+b≤2, 0<c<10, 0<y<24 and 0<z<17; and $Si_aSn_bO_yN_zX_n$ with $X_n$ at least one of the elements out of F, Cl, Br, I, S, Se, Te, P, As, Sb, Bi, Ge, Pb and a>0, b>0, a+b≤2, 0<y≤A and 0<z≤3.

(iv) the nitrides of the type $Si_xN_y$ (in particular with x=3 and y=4), $Sn_xN_y$ (in particular with x=3 and y=4), $Zn_xN_y$ (in particular with x=3 and y=4), $Li_{3-x}M_xN$ (with M=Co, Ni, Cu);

(v) the oxides $SnO_2$, $Li_4Ti_5O_{12}$, $SnB_{0.6}P_{0.4}O_{2.9}$ and $TiO_2$. $Li_4Ti_5O_{12}$ is particularly preferred; it is an insertion material that inserts the lithium ions in a reversible manner, without leading to deformation of the host material.

According to the invention, the method for manufacturing an all-solid battery comprises a step b) of depositing a layer of cathode materials, preferably via electrophoresis; these materials are preferably chosen from:

(i) the oxides $LiMn_2O_4$, $LiCoO_2$, $LiNiO_2$, $LiMn_{1.5}Ni_{0.5}O_4$, $LiMn_{1.5}Ni_{0.5-x}X_xO_4$ (where x is selected from Al, Fe, Cr, Co, Rh, Nd, other rare earths, and where 0<x<0.1), $LiFeO_2$, $LiMn_{1/3}Ni_{1/3}Co_{1/3}O_4$;

(ii) the phosphates $LiFePO_4$, $LiMnPO_4$, $LiCoPO_4$, $LiNiPO_4$, $Li_3V_2(PO_4)_3$;

(iii) all of the lithiated forms of the following chalcogenides: $V_2O_5$, $V_3O_8$, $TiS_2$, the oxysulfides of titanium ($TiO_yS_z$), the oxysulfides of tungsten ($WO_yS_z$), CuS, $CuS_2$.

The cathode electrode, consisting of a thin film of $LiMn_2O_4$ deposited on a metal substrate, preferably made of nickel, is advantageously deposited without using vacuum techniques or dry rooms, which are very costly facilities. Indeed, the $LiMn_2O_4$, like the $LiMn_{1.5}Ni_{0.5}O_4$, is not very sensitive against air, but prolonged exposure should still be avoided. However, the impact of exposure of the cathode materials to air during the manufacturing of the electrodes remains negligible since the duration of the implementation is relatively short.

For the deposition of the anode or of the cathode, nanoparticles of electronic conductive materials, and in particular of graphite, and/or nanoparticles of ionic conductive materials, of the type used to create the films of electrolyte (described below), or polymer materials comprising ionic groups can be added to the materials cited above.

For nanoparticles having a size of less than approximately 100 nm, the layers of anode, of cathode and of electrolyte can be deposited via electrospraying, electrophoresis, using an aerosol or via coating.

Advantageously, the layers of anode materials and of cathode materials are deposited via electrophoresis using a suspension of nanoparticles of anode material and of cathode material, respectively. These layers are advantageously deposited directly on their metal substrate used as a current collector.

Advantageously, the layers of anode, of cathode and of electrolyte are all deposited via electrophoresis. This specific embodiment of the method according to the invention allows dense and compact layers of nanoparticles to be obtained, in particular via self-densification (called "self-sintering") of the layer of nanoparticles during the step of electrophoretic deposition, drying and/or heat treatment at low temperature. Moreover, since the layers of nanoparticles of anode materials or of cathode materials deposited via electrophoresis are compact, the risk of cracking of the layer after drying is reduced, contrary to the layers of nanoparticles made from inks or fluids having low solid content and for which the deposits contain large quantities of solvent, which, after drying, leads to the appearance of cracks in the deposit, which has a negative effect on the operation of a battery.

According to the invention, the layer of anode materials or of cathode materials is deposited directly on its conductive substrate, preferably a metal conductive substrate chosen from the following materials: nickel, aluminum, stainless steel, titanium or copper. In a preferred embodiment, the layer of anode material or of cathode material is deposited on a substrate made of nickel. In general, it is preferred for the thickness of the metal conductive substrate to be less than 10 µm, preferably less than 5 µm.

Said conductive substrates can be provided in the form of sheets, optionally sheets comprising the patterns of the electrodes precut, or in the form of strips. In order to improve the quality of the electric contacts with the electrodes, the substrates can advantageously be coated with a metal or an alloy of metals, preferably chosen from gold, chromium, stainless steel, palladium, molybdenum, titanium, tantalum and silver.

According to the invention, the deposition of a layer of nanoparticles of anode material or of cathode material directly on its conductive substrate, for example via electrophoresis, allows a dense layer having a nanocrystalline structure to be obtained. However, the formation of grain boundaries is possible, leading to the formation of a layer having a particular structure, between that of an amorphous and crystallized material, which can in certain cases limit the kinetics of diffusion of the lithium ions in the thickness of the electrode. Thus, the power of the electrode of the battery and the life cycle can be affected. Advantageously, in order to improve the performance of the battery, a recrystallization heat treatment is carried out in order to improve the crystallinity, and optionally the consolidation of the electrode is carried out in order to reinforce the power of the electrodes (anode and/or cathode).

The recrystallization heat treatment of the layer of anode and/or of cathode is carried out at a temperature between 300° C. and 1000° C., preferably between 400° C. and 800° C., and even more preferably between 500° C. and 700° C. It must occur after the step a) and/or b) of depositing the layer of anode and/or of cathode, and after the step c) of depositing the layer of electrolyte.

According to the invention, the method for manufacturing a battery comprises a step c) of depositing a layer of electrolyte material. The layer of electrolyte material is deposited on the layer of anode material, and/or on the layer of cathode material.

The deposition of a layer of solid electrolyte on the layer of anode and/or of cathode allows the electrochemical cell to be protected from an internal short circuit. It also allows an all-solid battery that comprises an increased service life and is easy to manufacture to be manufactured. The layer of electrolyte material is preferably deposited via electrophoresis.

More particularly, the materials chosen as electrolyte materials are preferably chosen from the following materials:

on the layer of material obtained in step a) and/or b):
the garnets having the formula $Li_d A^1_x A^2_y (TO_4)_z$ where
$A^1$ is a cation having the oxidation state +II, preferably Ca, Mg, Sr, Ba, Fe, Mn, Zn, Y, Gd; and where
$A^2$ is a cation having the oxidation state +III, preferably Al, Fe, Cr, Ga, Ti, La; and where
$(TO_4)$ is an anion in which T is an atom having the oxidation state +IV, located at the center of a tetrahedron formed by the atoms of oxygen, and wherein $TO_4$ advantageously represents the anion silicate or zirconate, wherein all or a portion of the elements T having an oxidation state of +IV can be replaced by atoms having an oxidation state of +III or +V, such as Al, Fe, As, V, Nb, In, Ta;
wherein: d is between 2 and 10, preferably between 3 and 9, and more preferably between 4 and 8; x is 3 but can be between 2.6 and 3.4 (preferably between 2.8 and 3.2); y is 2 but can be between 1.7 and 2.3 (preferably between 1.9 and 2.1) and z is 3 but can be between 2.9 and 3.1;
the garnets, preferably chosen from: $Li_7La_3Zr_2O_{12}$; $Li_6La_2BaTa_2O_{12}$; $Li_{5.5}La_3Nb_{1.75}In_{0.25}O_{12}$; $Li_5La_3M_2O_{12}$ with M=Nb or Ta or a mixture of the two compounds; $Li_{7-x}Ba_xLa_{3-x}M_2O_{12}$ with 0≤x≤2 and M=Nb or Ta or a mixture of the two compounds; $Li_{7-x}La_3Zr_{2-x}M_xO_{12}$ with 0≤x≤2 and M=Al, Ga or Ta or a mixture of two or three of these compounds;
the lithiated phosphates, preferably chosen from: $Li_3PO_4$; $Li_3(Sc_{2-x}M_x)(PO_4)_3$ with M=Al or Y and 0≤x≤1; $Li_{1+x}M_x(Sc)_{2-x}(PO_4)_3$ with M=Al, Y, Ga or a mixture of the three compounds and 0≤x≤0.8; $Li_{1+x}M_x(Ga_{1-y}Sc_y)_{2-x}(PO_4)_3$ with 0≤x≤0.8; 0≤y≤1 and M=Al or Y or a mixture of the two compounds; $Li_{1+x}M_x(Ga)_{2-x}(PO_4)_3$ with M=Al, Y or a mixture of the two compounds and 0≤x≤0.8; $Li_{1+x}Al_xTi_{2-x}(PO_4)_3$ with 0≤x≤1, or $Li_{1+x}Al_xGe_{2-x}(PO_4)_3$ with 0≤x≤1; or $Li_{1+x+z}M_x(Ge_{1-y}Ti_y)_{2-x}Si_zP_{3-z}O_{12}$ with 0≤x≤0.8 and 0≤y≤1.0 & 0≤z≤0.6 and M=Al, Ga or Y or a mixture of two or three of these compounds; $Li_{3+y}(Sc_{2-x}M_x)Q_yP_{3-y}O_{12}$, with M=Al and/or Y and Q=Si and/or Se, 0≤x≤0.8 and 0≤y≤1; or $Li_{1+x+y}M_xSc_{2-x}Q_yP_{3-y}O_{12}$, with M=Al, Y, Ga or a mixture of the three compounds and Q=Si and/or Se, 0≤x≤0.8 and 0≤y≤1; or $Li_{1+x+y+z}M_x(Ga_{1-y}Sc_y)_{2-x}Q_zP_{3-z}O_{12}$ with 0≤x≤0.8; 0≤y≤1; 0≤z≤0.6 with M=Al or Y or a mixture of the two compounds and Q=Si and/or Se; or $Li_{1+x}N_xM_{2-x}P_3O_{12}$, with $0 \le x \le 1$ and N=Cr and/or V, M=Sc, Sn, Zr, Hf, Se or Si, or a mixture of these compounds;

the lithiated sulfur compounds, preferably chosen from: $Li_xAl_{z-y}Ga_yS_w(PO_4)_c$ with $4<w<20$, $3<x<10$, $0 \le y<1$, $1 \le z<4$ and $0<c<20$; $Li_xAl_{z-y}Ga_yS_w(BO_3)_c$ with $4<w<20$, $3<x<10$, $0 \le y<1$, $1 \le z<4$ and $0<c<20$; $Li_xAl_{z-y}Sc_yS_w(PO_4)_c$ with $4<w<20$, $3<x<10$, $0 \le y<1$, $1 \le z<4$ and $0<c<20$; $Li_xAl_{z-y}Sc_yS_w(BO_3)_c$ with $4<w<20$, $3<x<10$, $0 \le y<1$, $1 \le z<4$ and $0<c<20$; $Li_xGe_{z-y}Si_yS_w(PO_4)_c$ with $4<w<20$, $3<x<10$, $0 \le y<1$, $1 \le z<4$ and $0<c<20$; $Li_xGe_{(z-y)}Si_yS_w(BO_3)_c$ with $4<w<20$, $3<x<10$, $0 \le y<1$, $1 \le z<4$ and $0<c<20$;

the lithiated borates, preferably chosen from: $Li_3(Sc_{2-x}M_x)(BO_3)_3$ with M=Al or Y and $0 \le x \le 1$; $Li_{1+x}M_x(Sc)_{2-x}(BO_3)_3$ with M=Al, Y, Ga or a mixture of the three compounds and $0 \le x \le 0.8$; $0 \le y \le 1$; $Li_{1+x}M_x(Ga_{1-y}Sc_y)_{2-x}(BO_3)_3$ with $0 \le x \le 0.8$; $0 \le y \le 1$ and M=Al or Y; $Li_{1+x}M_x(Ga)_{2-x}(BO_3)_3$ with M=Al, Y or a mixture of the two compounds and $0 \le x \le 0.8$; $0 \le y \le 1$; $Li_3BO_3$, $Li_3BO_3$—$Li_2SO_4$, $Li_3BO_3$—$Li_2SiO_4$, $Li_3BO_3$—$Li_2SiO_4$—$Li_2SO_4$;

the oxynitrides, preferably chosen from $Li_3PO_{4-x}N_{2x/3}$, $Li_4SiO_{4-x}N_{2x/3}$, $Li_4GeO_{4-x}N_{2x/3}$ with $0<x<4$ or $Li_3BO_{3-x}N_{2x/3}$ with $0<x<3$; the materials containing lithium oxynitrides of phosphorus or of boron (called LiPON and LIBON) that can also contain silicon, sulfur, zirconium, aluminum, or a combination of aluminum, boron, sulfur and/or silicon, and boron for the of lithium of phosphorus;

the lithiated oxides, preferably chosen from $Li_7La_3Zr_2O_{12}$ or $Li_{5+x}La_3(Zr_x,A_{2-x})O_{12}$ with A=Sc, Y, Al, Ga and $1.4 \le x \le 2$ or $Li_{0.35}La_{0.55}TiO_3$;

the silicates, preferably chosen from $Li_2Si_2O_5$, $Li_2SiO_3$, $Li_2Si_2O_6$, $LiAlSiO_4$, $Li_4SiO_4$, $LiAlSi_2O_6$;

the antiperovskite solid electrolytes chosen from: $Li_3OA$ with A a halide or a mixture of halides, preferably at least one of the elements chosen from F, Cl, Br, I or a mixture of two or three or four of these elements; $Li_{(3-x)}M_{x/2}OA$ with $0<x \le 3$, M a divalent metal, preferably at least one of the elements chosen from Mg, Ca, Ba, Sr or a mixture of two or three or four of these elements, A a halide or a mixture of halides, preferably at least one of the elements chosen from F, Cl, Br, I or a mixture of two or three or four of these elements; $Li_{(3-x)}N_{x/3}OA$ with $0 \le x \le 3$, N a trivalent metal, A a halide or a mixture of halides, preferably at least one of the elements chosen from F, Cl, Br, I or a mixture of two or three or four of these elements; or $LiCOX_zY_{(1-z)}$, with X and Y halides and $0 \le z \le 1$;

Preferably, when a layer of electrolyte material is deposited only on the layer obtained in step b), a layer of electrolyte material chosen from the following is deposited:

$Li_3(Sc_{2-x}M_x)(PO_4)_3$ with M=Al or Y and $0 \le x \le 1$; or $Li_{1+x}M_x(Sc)_{2-x}(PO_4)_3$ with M=Al, Y, Ga or a mixture of two or three of the compounds and $0 \le x \le 0.8$; $0 \le y \le 1.0$; or $Li_{1+x}M_x(Ga)_{2-x}(PO_4)_3$ with M=Al, Y or a mixture of the two compounds M and $0 \le x \le 0.8$; $0 \le y \le 1.0$; or $Li_{1+x}M_x(Ga_{1-y}SC_y)_{2-x}(PO_4)_3$ with $0 \le x \le 0.8$; $0 \le y \le 1.0$ and M=Al or Y, or a mixture of the two compounds; or $Li_{1+x}Al_xTi_{2-x}(PO_4)_3$ with $0 \le x \le 1$, or $Li_{1+x}Al_xGe_{2-x}(PO_4)_3$ with $0 \le x \le 1$; or $Li_{1+x+z}M_x(Ge_{1-y}Ti_y)_{2-x}Si_zP_{3-z}O_{12}$ with $0 \le x \le 0.8$ and $0 \le y \le 1.0$ & $0 \le z \le 0.6$ and M=Al, Ga or Y or a mixture of two or three of these compound; or The lithiated oxides chosen from $Li_7La_3Zr_2O_{12}$ and $Li_{5+x}La_3(Zr_x,A_{2-x})O_{12}$ with A=Sc, Y, Al, Ga and $1.4 \le x \le 2$, $Li_{0.35}La_{0.55}TiO_3$ or $Li_{0.5}La_{0.5}TiO_3$;

the lithiated borates, preferably chosen from: $Li_3(Sc_{2-x}M_x)(BO_3)_3$ with M=Al or Y and $0 \le x \le 1$; $Li_{1+x}M_x(Sc)_{2-x}(BO_3)_3$ with M=Al, Y, Ga or a mixture of the three compounds and $0 \le x \le 0.8$; $0 \le y \le 1$; $Li_{1+x}M_x(Ga_{1-y}Sc_y)_{2-x}(BO_3)_3$ with $0 \le x \le 0.8$; $0 \le y \le 1$ and M=Al or Y; $Li_{1+x}M_x(Ga)_{2-x}(BO_3)_3$ with M=Al, Y or a mixture of the two compounds and $0 \le x \le 0.8$; $0 \le y \le 1$; $Li_3BO_3$, $Li_3BO_3$—$Li_2SO_4$, $Li_3BO_3$—$Li_2SiO_4$, $Li_3BO_3$—$Li_2SiO_4$—$Li_2SO_4$;

the oxynitrides, preferably chosen from $Li_3PO_{4-x}N_{2x/3}$, $Li_4SiO_{4-x}N_{2x/3}$, $Li_4GeO_{4-x}N_{2x/3}$ with $0<x<4$ or $Li_3BO_{3-x}N_{2x/3}$ with $0<x<3$; the materials containing lithium oxynitrides of phosphorus or of boron (called LiPON and LIBON) that can also contain silicon, sulfur, zirconium, aluminum, or a combination of aluminum, boron, sulfur and/or silicon, and boron for the of lithium of phosphorus;

the silicates, preferably chosen from $Li_2Si_2O_5$, $Li_2SiO_3$, $Li_2Si_2O_6$, $LiAlSiO_4$, $Li_4SiO_4$, $LiAlSi_2O_6$.

Advantageously, the layer of solid electrolyte is deposited via electrophoresis of electrically insulating nanoparticles of electrolyte material. The layers obtained are totally covering, without local defects. The density of the deposition current is concentrated in the least insulating zones, in particular located where a defect is possibly present. Advantageously, in order to improve the performance of the battery, the layer of electrolyte is then dried and consolidated via heat treatment. The absence of defects in the layer of electrolyte prevents the appearance of a creeping short circuit, excessive self-discharge, or even failure of the cell of the battery.

The performance of the batteries obtained via the method according to the invention is in part due to the structure of the electrolyte material(s). To obtain good performance of the battery, it is advantageous to obtain an electrolyte made of amorphous glass, or nanocrystalline structures. Thus, in order to prevent the growth of the grains of the electrolyte materials after their deposition, and in order to avoid creating reactions at the interfaces, the assembly of the battery must not be carried out at a high temperature, i.e. the temperature must not exceed 500° C., and preferably must be lower than 350° C.

According to the invention, after the deposition of the layer of electrolyte material, a layer of an ionic conductive material is created:

either on the layer of anode material coated with a layer of solid electrolyte material and/or on the layer of cathode material coated or not coated with a layer of solid electrolyte material;

or on the layer of cathode material coated with a layer of solid electrolyte material and/or on the layer of anode material coated or not coated with a layer of solid electrolyte material.

Preferably, the ionic conductive material is chosen from mineral salts, and can be dissolved in a solvent; this solvent allowing these materials to be made sufficiently fluid to be able to be applied. This fluidity is necessary in order to imbibe the porosities of the support when the latter contains residual porosities, and/or in order to deposit a thin film of several tens or even hundreds of nanometers on the surface of the film of solid electrolyte when the latter is consolidated.

A solvent, allowing the ionic conductor to be dissolved, can be used in order to facilitate its application; this solvent being completely eliminated during a later step of drying the layer obtained after the deposition of this solution.

After drying, a layer of an ionic conductive material is obtained. The battery thus obtained does not therefore comprise a material in liquid phase.

In one embodiment of the method according to the invention, the ionic conductive material is directly deposited via dip coating, via spin coating, roll coating, doctor blade, electrospraying, or electrophoresis. For this, first, the ionic conductive material is dissolved in a suitable solvent, the dissolved ionic conductive material is deposited on the layer(s) of anode, of cathode and/or of electrolyte, and then the layer of ionic conductive material is dried in order to eliminate the solvent. Such a deposit of an ionic conductive material allows the ionic conductivity of the electrolyte to be increased considerably and the adhesion between the layer on which the ionic conductive material is deposited and the facing layer, which can be a layer of anode, of cathode or of electrolyte, to be improved. This improvement is substantially related to the fact that these binding materials have low melting temperatures allowing sintering to be carried out in solution during the assembly or very malleable mechanical properties in order to guarantee perfect filling of the contacts between two rough interfaces.

Preferably, the ionic conductive material used in step d) is chosen from:
 a. the silicates, preferably chosen from $Li_2Si_2O_5$, $Li_2SiO_3$, $Li_2Si_2O_6$, $LiAlSiO_4$, $Li_4SiO_4$, $LiAlSi_2O_6$
 b. the glass-ceramic compounds chosen from the mixtures $Li_3BO_3$—$Li_2SO_4$, $Li_3BO_3$—$Li_2SiO_4$, $Li_3BO_3$—$Li_2SO_4Li_2SiO_4$,
 c. the ionic conductors of lithium ions chosen from: LiCl, LiBr, LiI, LiF, LiBH4, LiH, LiOH, $LiBO_2$, $LiPO_3$, $LiNO_3$, $Li_3N$, $Li_2SO_4$, $LiVO_3$, $Li_2MoO_4$, $Li_2B_4O_7$, or a mixture of these compounds.
 d. the antiperovskite solid electrolytes chosen from: $Li_3OA$ with A a halide or a mixture of halides, preferably at least one of the elements chosen from F, Cl, Br, I or a mixture of two or three or four of these elements; $Li_{(3-x)}M_{x/2}OA$ with $0<x\leq3$, M a divalent metal, preferably at least one of the elements chosen from Mg, Ca, Ba, Sr or a mixture of two or three or four of these elements, A a halide or a mixture of halides, preferably at least one of the elements chosen from F, Cl, Br, I or a mixture of two or three or four of these elements; $Li_{(3-x)}N_{x/3}OA$ with $0\leq x\leq3$, N a trivalent metal, A a halide or a mixture of halides, preferably at least one of the elements chosen from F, Cl, Br, I or a mixture of two or three or four of these elements; or $LiCOX_zY_{(1-z)}$, with X and Y halides and $0\leq z\leq 1$.

Advantageously, the materials that are ionic conductors of lithium ions (LiCl, LiBr, LiI, LiF, LiBH4, LiH, LiOH, $LiBO_2$, $LiPO_3$, $LiNO_3$, $Li_3N$, $Li_2SO_4$, $LiVO_3$, $Li_2MoO_4$, $Li_2B_4O_7$, or a mixture of these compounds) comprise at least one additional compound, preferably chosen, from the salts of halides, and advantageously chosen from the salts KCl, KBr, KI, KF, NaCl, NaBr, NaI and NaF.

According to a specific embodiment of the method of the invention, the electrodes (anode and cathode) are punched according to a cutout pattern in order to create cutouts having the dimensions of the battery to be created. The punching of the electrodes can be carried out after the step c) of depositing the layer of electrolyte, or after the step d) of depositing the layer of ionic conductive material. These patterns comprise three adjoining cutouts (for example in the shape of a U) that define the dimension of the battery. A second slot can be arranged on the uncut side in order to be able to ensure the passage of the products necessary for the encapsulation of the component. The anode and cathode electrodes are then stacked in an alternating manner in order to form a stack of a plurality of elementary cells. The patterns of cutouts of the anodes and cathodes are placed in a "top to tail" configuration.

In another specific embodiment of the method according to the invention, the electrodes are cut out before the step c) of depositing the layer(s) of electrolyte, allowing the edges of electrodes to be covered by a film of electrolyte, thus protecting the contact of the electrodes with the atmosphere, and allowing the calendar life of the battery to be improved. In an alternative embodiment, the cutouts are made on the substrates before the steps a) and b) of depositing the layer of anode and of cathode, allowing the edges of electrodes to be covered by a film of electrolyte. This specific embodiment has the advantage of covering the edges of electrodes before the deposition of the layer of electrolyte material, which then allows an encapsulation film to be easily created around the electrodes, especially when the layer of electrolyte consists of materials stable with regard to humidity. The covering of the lateral edges of the electrodes also allows the risks of short circuit in the cell to be reduced.

Finally, an essential step of the method according to the invention comprises a heat treatment and/or mechanical compression of the stack obtained previously in order to obtain an all-solid battery made of thin films. The heat treatment allowing the assembly of the battery is carried out at a temperature between 50 and 500° C., preferably less than 350° C., and even more preferably between 100 and 200° C. Advantageously, the temperature of the heat treatment does not exceed 200° C. Advantageously, the mechanical compression of the layers to be assembled is carried out at a pressure between 10 and 100 MPa, preferably between 20 and 50 MPa.

In a specific embodiment, the stack is encapsulated after the step of stacking and before the addition of the terminations, by depositing an encapsulation thin film for protecting the battery against the atmosphere. The encapsulation layer must be chemically stable, resist a high temperature and be impermeable to the atmosphere in order to be an effective barrier layer. Preferably, the encapsulation thin film consists of a polymer layer, layer of ceramic, layer made of glass or layer made of glass-ceramic, which can be for example in the form of oxide, nitride, phosphates, oxynitride, or siloxane. Even more preferably, this encapsulation layer is coated with an epoxy resin or silicone or parylene.

The encapsulation layer can be advantageously deposited via chemical vapor deposition (CVD), which provides covering of all of the surfaces of the accessible stack. Thus, the encapsulation can thus be carried out directly on the stacks, and the coating can penetrate all of the available cavities. Advantageously, a second organic encapsulation layer can be deposited on the first encapsulation layer in order to increase the protection of the batteries cells from their outside environment. Typically, the deposition of this second layer can be carried out via an impregnation of silicone. The choice of such a material comes from the fact that it resists high temperatures and the battery can thus be easily assembled via welding on electronic cards without the appearance of glass transitions.

Advantageously, the battery is encapsulated on four of the six faces of the stack. The encapsulation layers surround the periphery of the stack, the rest of the protection from the atmosphere being provided by the layers obtained by the terminations. Preferably, the cathode connections and anode connections are offset laterally, which allows the encapsulation layer to function as a dielectric in order to prevent the presence of a short circuit on these ends.

Once the stack has been created, and after the step of encapsulation of the stack if the latter is carried out, the terminations (electric contacts) are added at the location where the cathode current collectors and anode current collectors are visible (not coated with insulating electrolyte). These contact zones can be on the opposite sides of the stack in order to collect the current but also or on adjacent sides.

In order to create the terminations, the stack, optionally coated, is cut along cutting planes that allow individual battery components to be obtained, with the (+) and (−) connections of the battery being exposed on each of the cutting planes. The connections can then be metallized using plasma deposition techniques known to a person skilled in the art and/or via immersion in a conductive epoxy resin (loaded with silver) and/or a molten tin bath. The terminations allow the alternatingly positive and negative connections on each of the ends to be connected. These terminations allow the electric connections to be created in parallel between the various battery elements. For this, only the (+) connections open onto one end, and the (−) are available on the other ends.

Since this battery is all solid, and uses a material for insertion of the lithium as the anode material, the risks of formation of dendrites of metallic lithium during the steps of recharging are zero and the lithium insertion capacity of the anode becomes limited.

Also, in order to guarantee good cycling performance of the battery according to the invention, the battery architecture for which the surface capacity of the cathodes is greater than or equal to the surface capacity of the anodes is preferred.

The layers forming the battery that is all solid, the risk of formation of dendrites of lithium no longer exists when the anode is totally charged. Thus, such a battery architecture prevents the creation of overcharging of battery cells.

Also, the creation of such a battery with cathode surface capacities that are greater than or equal to those of the anodes allows the performance in terms of service life, expressed in number of cycles, to be improved. Indeed, since the electrodes are dense and all solid, the risk of loss of electric contact between the particles is zero. Moreover, there is no longer a risk of deposition of metallic lithium in the electrolyte or in the porosities of the electrodes, and finally the risk of deterioration of the crystalline structure of the cathode material is nonexistent.

Here, we indicate several concrete operating modes for carrying out the invention. A suspension of the anode material is prepared via grinding/dispersion of a powder (for example of $Li_4Ti_5O_{12}$) in absolute ethanol (typically at approximately 10 g/L with several ppm of citric acid). A suspension of cathode material is prepared via grinding/dispersion of a powder (for example of $LiMn_2O_4$), typically in water at approximately 10 g/L. A suspension of ceramic electrolyte material is also prepared via grinding/dispersion of a powder (for example of $Li_3Al_{0.4}Sc_{1.6}(PO_4)_3$), typically in absolute ethanol (for example at 5 g/L). For all these suspensions, the grinding is carried out in such a way as to obtain stable suspensions with particle sizes of less than 100 nm.

The negative electrodes can be prepared via electrophoretic deposition of the nanoparticles of $Li_4Ti_5O_{12}$ contained in the suspension described above, in the form of a thin film typically deposited on the two faces of a first substrate (thickness for example 1 μm); this layer of anode is then heat treated at approximately 600° C.

The positive electrodes can be prepared in the same way, via electrophoretic deposition using the suspension of $LiMn_2O$ described above, in the form of a thin film typically deposited on the two faces of a second substrate; this layer of cathode (thickness for example 1 μm) is then heat treated at approximately 600° C.

After these heat treatments, the anodes and cathode are coated with a layer of ceramic electrolyte (for example made of $Li_3Al_{0.4}Sc_{1.6}(PO_4)_3$, abbreviated LASP), deposited for example via EPD. A thickness of LASP of approximately 500 nm on each electrode is suitable for this material. These films of electrolyte are then dried and consolidated by heat treatment at approximately 600° C.

The formulation of ionic conductor used to carry out the assembly of the battery cell is the following. A solution of an ionic conductive material is prepared, for example an aqueous solution of $LiPO_3$ at 0.3 mol % via stoichiometric mixture of $HPO_3$ metaphosphoric acid and LiOH.

The electrodes coated with the film of solid electrolyte are then coated with a fine layer of ionic conductors, preferably via dip coating followed by drying for 5 h in air. Then, the anode and the cathode are stacked on their faces of electrolyte coated as described above in order to carry out the assembly; the assembly is maintained under pressure (typically for 15 minutes at 500° C.). A battery than can be tested via cycling between 2 and 2.7V is thus obtained.

What is claimed is:

1. A method for manufacturing an all-solid battery made of thin films, comprising:
   (a) depositing at least one layer of anode material on a first conductive substrate selected from a group formed by a metal sheet, a metal strip, a metallized insulating sheet, a metallized insulating strip, and a metallized insulating film, said first conductive substrate or conductive elements thereof to act as an anode current collector;
   (b) depositing, before or after depositing the at least one layer of anode material, at least one layer of cathode material on a second conductive substrate selected from a group formed by a metal sheet, a metal strip, a metallized insulating sheet, a metallized insulating strip, and a metallized insulating film, said second conductive substrate or conductive elements thereof to act as a cathode current collector;
   (c) depositing at least one layer of solid electrolyte material on the deposited at least one layer of anode material or on the deposited at least one layer of cathode material;
   (d) depositing, after depositing the at least one layer of solid electrolyte material, a layer of a solution of an ionic conductive material composed of at least one lithium salt on the deposited at least one layer of anode material and/or the deposited at least one layer of cathode material;
   (e) drying the deposited layer of the solution of the ionic conductive material to obtain a layer of an ionic conductive material, the thickness of the layer of the solution of the ionic conductive material being less than 2 μm;
   (f) successively stacking, after drying the deposited layer of the solution of the ionic conductive material, the deposited at least one layer of anode material, face on face, with the deposited at least one layer of cathode material; and
   (g) conducting a heat treatment and/or mechanical compression on the stack to obtain the all-solid battery.

2. The method of claim 1, further comprising, after a) and/or b) and/or c), conducting a recrystallization heat treatment of the deposited at least one layer of anode material and/or the deposited at least one layer of cathode material and/or the deposited at least one layer of solid electrolyte material, respectively, at a temperature between 500° C. and 700° C.

3. The method of claim 1, wherein the ionic conductive material comprises at least one of:

silicates chosen from $Li_2Si_2O_5$, $Li_2SiO_3$, $Li_2Si_2O_6$, $LiAlSiO_4$, $Li_4SiO_4$, $LiAlSi_2O_6$, glass-ceramic compounds chosen from mixtures of $Li_3BO_3$—$Li_2SO_4$, $Li_3BO_3$—$Li_2SiO_4$, $Li_3BO_3$—$Li_2SO_4Li_2SiO_4$;

ionic conductors of lithium ions chosen from: LiCl, LiBr, LiI, LiF, LiBH4, LiH, LiOH, $LiBO_2$, $LiPO_3$, $LiNO_3$, $Li_3N$, $Li_2SO_4$, $LiVO_3$, $Li_2MoO_4$, $Li_2B_4O_7$, or a mixture thereof; and antiperovskite solid electrolytes chosen from: $Li_3OA$ with a halide or a mixture of halides, at least one of F, Cl, Br, I or a mixture thereof; $Li_{(3-x)}M_{x/2}OA$ where $0 < x \leq 3$, M a divalent metal, at least one of the elements chosen from Mg, Ca, Ba, Sr, or a mixture thereof; a halide or a mixture of halides, at least one of the elements chosen from F, Cl, Br, I, or a mixture thereof; $Li_{(3-x)}N_{x/3}OA$ where $0 \leq x \leq 3$, N a trivalent metal, A, a halide or a mixture of halides, at least one of the elements chosen from F, Cl, Br, I or a mixture thereof; or $LiCOX_zY_{(1-z)}$, where X and Y halides and $0 \leq z \leq 1$.

4. The method of claim 3, wherein the materials that are ionic conductors of lithium ions are used in amorphous form.

5. The method of claim 3, wherein the materials that are ionic conductors of lithium ions comprise at least one additional compound, chosen from salts of KCl, KBr, KI, KF, NaCl, NaBr, NaI and NaF.

6. The method of claim 1, wherein depositing the at least one layer of anode material, depositing the at least one layer of cathode material, and depositing the at least one layer of solid electrolyte material comprises depositing via at least one of:

physical vapor deposition (PVD) via evaporation under vacuum, via laser ablation, via an ion beam, or via cathode sputtering;

plasma-enhanced (PECVD), laser-assisted (LACVD), or aerosol-assisted (AA-CVD);

atomic layer deposition (ALD);

electrospraying;

electrophoresis;

aerosol deposition;

sol-gel; and dip coating, spin coating, or a Langmuir-Blodgett method.

7. The method of claim 1, wherein depositing the at least one layer of anode material, depositing the at least one layer of cathode material, and depositing the at least one layer of solid electrolyte material respectively comprises depositing via electrophoresis.

8. The method of claim 1, wherein the at least one layer of anode material and the at least one layer of cathode material respectively comprise graphite and/or nanoparticles of materials that conduct lithium ions of a type used to create the at least one layer of solid electrolyte material, or polymer materials comprising ionic groups.

9. The method of claim 1, wherein:

depositing the at least one layer of anode material comprises depositing via deposition of nanoparticles of anode material using at least one of electrospraying, electrophoresis, aerosol deposition, and coating; and/or depositing the at least one layer of cathode material comprises depositing via deposition of nanoparticles of cathode material using at least one of electrospraying, electrophoresis, aerosol deposition, and coating; and/or depositing the at least one layer of solid electrolyte material comprises depositing via deposition of nanoparticles of electrolyte material using at least one of electrospraying, electrophoresis, aerosol deposition, and coating.

10. The method of claim 1, wherein:

depositing the at least one layer of anode material comprises depositing via electrophoresis deposition of nanoparticles of anode material;

depositing the at least one layer of cathode material comprises depositing via electrophoresis deposition of nanoparticles of cathode material;

depositing the at least one layer of solid electrolyte material comprises depositing via electrophoresis deposition of nanoparticles of electrolyte material.

11. The method of claim 1, wherein:

conducting the heat treatment comprises conducting the heat treatment at a temperature between 100° C. and 200° C.; and/or conducting the mechanical compression comprises conducting the mechanical compression at a pressure between 20 and 50 MPa.

12. The method of claim 1, wherein the anode material is composed of a material chosen from:

oxynitrides of tin (of a type $SnO_xN_y$);

lithium iron phosphate (of a type $LiFePO_4$);

mixed oxynitrides of silicon and tin (of a type $Si_aSn_bO_yN_z$ with $a>0$, $b>0$, $a+b \leq 2$, $0<y \leq 4$, $0<z \leq 3$) (also called SiTON), oxynitride-carbides of a type $Si_aSn_bC_cO_yN_z$ with $a>0$, $b>0$, $a+b \leq 2$, $0<c<10$, $0<y<24$, $0<z<17$, $Si_aSn_bC_cO_yN_zX_n$ with $X_n$ at least one element including F, Cl, Br, I, S, Se, Te, P, As, Sb, Bi, Ge, and Pb and where $a>0$, $b>0$, $a+b>0$, $a+b \leq 2$, $0<c<10$, $0<y<24$ and $0<z<17$, and $Si_aSn_bO_yN_zX_n$ with $X_n$ at least one element including F, Cl, Br, I, S, Se, Te, P, As, Sb, Bi, Ge, and Pb where $a>0$, $b>0$, $a+b \leq 2$, $0<y \leq 4$ and $0<z \leq 3$;

nitrides of a type $Si_xN_y$ where $x=3$ and $y=4$, $Sn_xN_y$ where $x=3$ and $y=4$, $Zn_xN_y$ where $x=3$ and $y=4$, and $Li_{3-x}M_xN$ where M=Co, Ni, and Cu;

oxides $SnO_2$, $Li_4Ti_5O_{12}$, $SnB_{0.6}P_{0.4}O_{2.9}$, and $TiO_2$.

13. The method of claim 1, wherein the cathode material is composed of a material chosen from:

oxides $LiMn_2O_4$, $LiCoO_2$, $LiNiO_2$, $LiMn_{1.5}Ni_{0.5}O_4$, $LiMn_{1.5}Ni_{0.5-x}X_xO_4$ where x is selected from Al, Fe, Cr, Co, Rh, Nd, and other rare earths, and where $0<x<0.1$, $LiFeO_2$, and $LiMn_{1/3}Ni_{1/3}Co_{1/3}O_4$;

phosphates $LiFePO_4$, $LiMnPO_4$, $LiCoPO_4$, $LiNiPO_4$, and $Li_3V_2(PO_4)_3$, phosphates of a type $LiMM'PO_4$ where M and M' (M≠M') are selected from Fe, Mn, Ni, Co, and V;

all lithiated forms of chalcogenides that include $V_2O_5$, $V_3O_8$, and $TiS_2$, oxysulfides of titanium of a type $TiO_yS_z$, oxysulfides of tungsten of a type $WO_yS_z$, CuS, and $CuS_2$.

14. The method of claim 1, wherein the electrolyte material is composed of a material chosen from:

garnets of a type $Li_d A^1_x A^2_y (TO_4)_z$ where $A^1$ is a cation having an oxidation state +II, $A^2$ is a cation having an oxidation state +III, $TO_4$ is an anion where T is an atom having an oxidation state +IV, located at a center of a tetrahedron formed by atoms of oxygen, or $TO_4$ represents the anion silicate or zirconate, or all or a portion of T is an atom having an oxidation state of +III or +V, where d is between 4 and 8, x is between 2.8 and 3.2, y is between 1.9 and 2.1, and z is between 2.9 and 3.1;

garnets chosen from $Li_7La_3Zr_2O_{12}$, $Li_6La_2BaTa_2O_{12}$, $Li_{5.5}La_3Nb_{1.75}In_{0.25}O_{12}$, and $Li_5La_3M_2O_{12}$ where M=Nb or Ta or a mixture thereof, $Li_{7-x}Ba_xLa_{3-x}M_2O_{12}$ where $0\le x\le 1$ and M=Nb or Ta or a mixture thereof, $Li_{7-x}La_3Zr_{2-x}M_xO_{12}$ where $0\le x\le 2$ and M=Al, Ga or Ta or a mixture thereof;

lithiated phosphates chosen from $Li_3PO_4$; $Li_3(Sc_{2-x}M_x)(PO_4)_3$ where M=Al or Y and $0\le x\le 1$, $Li_{1+x}M_x(Sc)_{2-x}(PO_4)_3$ where M=Al, Y, Ga or a mixture thereof and $0\le x\le 0.8$, $Li_{1+x}M_x(Ga_{1-y}Sc_y)_{2-x}(PO_4)_3$ where $0\le x\le 0.8$, $0\le y\le 1$, and M=Al or Y or a mixture thereof, $Li_{1+x}M_x(Ga)_{2-x}(PO_4)_3$ where M=Al, Y, or a mixture thereof and $0\le x\le 0.8$, $Li_{1+x}Al_xTi_{2-x}(PO_4)_3$ where $0\le x\le 1$, or $Li_{1+x}Al_xGe_{2-x}(PO_4)_3$ where $0\le x\le 1$, or $Li_{1+x+z}M_x(Ge_{1-y}Ti_y)_{2-x}Si_zP_{3-z}O_{12}$ where $0\le x\le 0.8$, $0\le y\le 1.0$, $0\le z\le 0.6$ and M=Al, Ga or Y or a mixture thereof, $Li_{3+y}(Sc_{2-x}M_x)Q_yP_{3-y}O_{12}$, where M=Al and/or Y and Q=Si and/or Se, $0\le x\le 0.8$ and $0\le y\le 1$, or $Li_{1+x+y}M_xSc_{2-x}Q_yP_{3-y}O_{12}$, where M=Al, Y, Ga or a mixture thereof and Q=Si and/or Se, $0\le x\le 0.8$ and $0\le y\le 1$, or $Li_{1+x+y+z}M_x(Ga_{1-y}Sc_y)_{2-x}Q_zP_{3-z}O_{12}$ where $0\le x\le 0.8$; $0\le y\le 1$; $0\le z\le 0.6$ where M=Al or Y or a mixture thereof, and Q=Si and/or Se; or $Li_{1+x}N_xM_{2-x}P_3O_{12}$, where $0\le x\le 1$ and N═Cr and/or V, M=Sc, Sn, Zr, Hf, Se or Si, or a mixture thereof;

lithiated sulfur compounds chosen from: $Li_xAl_{z-y}Ga_yS_w(PO_4)_c$ with $4<w<20$, $3<x<10$, $0\le y<1$, $1\le z<4$ and $0<c<20$; $Li_xAl_{z-y}Ga_yS_w(BO_3)_c$ with $4<w<20$, $3<x<10$, $0\le y<1$, $1\le z<4$ and $0<c<20$; $Li_xAl_{z-y}Sc_yS_w(PO_4)_c$ where $4<w<20$, $3<x<10$, $0\le y<1$, $1\le z<4$ and $0<c<20$, $Li_xAl_{z-y}Sc_yS_w(BO_3)_c$ where $4<w<20$, $3<x<10$, $0\le y<1$, $1\le z<4$ and $0<c<20$, $Li_xGe_{z-y}Si_yS_w(PO_4)_c$ where $4<w<20$, $3<x<10$, $0\le y<1$, $1\le z<4$ and $0<c<20$, and $Li_xGe_{(z-y)}Si_yS_w(BO_3)_c$ where $4<w<20$, $3<x<10$, $0\le y<1$, $1\le z<4$ and $0<c<20$;

lithiated borates chosen from: $Li_3(Sc_{2-x}M_x)(BO_3)_3$ where M=Al or Y and $0\le x\le 1$, $Li_{1+x}M_x(Sc)_{2-x}(BO_3)_3$ where M=Al, Y, Ga or a mixture thereof, and $0\le x\le 0.8$; $0\le y\le 1$; $Li_{1+x}M_x(Ga_{1-y}Sc_y)_{2-x}(BO_3)_3$ where $0\le x\le 0.8$, $0\le y\le 1$, and M=Al or Y, $Li_{1+x}M_x(Ga)_{2-x}(BO_3)_3$ where M=Al, Y, or a mixture thereof, and $0\le x\le 0.8$, $0\le y\le 1$, $Li_3BO_3$, $Li_3BO_3$—$Li_2SO_4$, $Li_3BO_3$—$Li_2SiO_4$, and $Li_3BO_3$—$Li_2SiO_4$—$Li_2SO_4$;

oxynitrides chosen from $Li_3PO_{4-x}N_{2x/3}$, $Li_4SiO_{4-x}N_{2x/3}$, $Li_4GeO_{4-x}N_{2x/3}$ where $0<x<4$, or $Li_3BO_{3-x}N_{2x/3}$ where $0<x<3$, materials containing lithium oxynitrides of phosphorus or of boron (called LiPON and LIBON) that also contain silicon, sulfur, zirconium, aluminum, or a combination of aluminum, boron, sulfur and/or silicon, and boron for lithium of phosphorus;

lithiated oxides chosen from $Li_7La_3Zr_2O_{12}$, or $Li_{5+x}La_3(Zr_x,A_{2-x})O_{12}$ where A=Sc, Y, Al, Ga and $1.4\le x\le 2$, or $Li_{0.35}La_{0.55}TiO_3$;

silicates chosen from $Li_2Si_2O_5$, $Li_2SiO_3$, $Li_2Si_2O_6$, $LiAlSiO_4$, $Li_4SiO_4$, and $LiAlSi_2O_6$;

antiperovskite solid electrolytes chosen from: $Li_3OA$ where A (a halide) or a mixture of halides, $Li_{(3-x)}M_{x/2}OA$ where $0<x\le 3$, M (a divalent metal), $Li_{(3-x)}N_{x/3}OA$ where $0\le x\le 3$, N (a trivalent metal), or $LiCOX_zY_{(1-z)}$, where X and Y are halides and $0\le z\le 1$.

15. The method of claim 1, further comprising, after conducting a heat treatment and/or mechanical compression on the stack:
   (h) encapsulating of the all-solid battery via deposition of at least one encapsulation layer of ceramic, glass, or glass-ceramic material.

16. The method of claim 1, wherein the nanoparticles of electrolyte materials have a size of less than 30 nm.

17. The method of claim 1, wherein the first conductive substrate and the second conductive substrate are respectively composed of aluminum, copper, stainless steel, nickel, and optionally coated with a noble metal chosen from: gold, platinum, palladium, vanadium, cobalt, nickel, manganese, of niobium, tantalum, chromium, molybdenum, titanium, zirconium, tungsten, or any alloy thereof.

18. A battery obtained by the method of claim 1.

* * * * *